United States Patent [19]

Johnson et al.

[11] Patent Number: 5,390,982
[45] Date of Patent: Feb. 21, 1995

[54] ADJUSTABLE BELT GUIDE AND HEADREST

[75] Inventors: Richard F. Johnson, Bloomfield Hills; Blaine J. Michael, Farmington Hills, both of Mich.

[73] Assignee: Douglas & Lomason Company, Farmington Hills, Mich.

[21] Appl. No.: 48,483

[22] Filed: Apr. 16, 1993

[51] Int. Cl.$^6$ .............................................. B60R 22/28
[52] U.S. Cl. ..................................... 297/410; 297/483
[58] Field of Search ............... 297/410, 391, 483, 473; 280/801 A, 808

[56] References Cited

U.S. PATENT DOCUMENTS

| | | | |
|---|---|---|---|
| 3,738,706 | 6/1973 | Caldemeyer | 297/410 |
| 4,801,156 | 1/1989 | Escaravage | 297/483 X |
| 5,131,720 | 7/1992 | Nemoto | 297/410 |
| 5,165,719 | 11/1992 | Yano | 280/801 A |

FOREIGN PATENT DOCUMENTS

4303054 10/1992 Japan ..................... 280/808

*Primary Examiner*—Laurie K. Cranmer
*Attorney, Agent, or Firm*—Harness, Dickey & Pierce

[57] ABSTRACT

An adjustable belt guide and headrest apparatus for a vehicle seat. The apparatus includes a pair of first track members and a pair of second track members slidable longitudinally relative to the first track members. An upper end of the second track members includes a cantilevered headrest frame member and a shoulder belt guide, both of which move towards and away from a seat back portion of the vehicle seat when the second frame rails are moved slidably. A threaded drive rod is fixedly secured to the second frame rails. The threaded drive rod is driven by an operator controllable, reversible DC motor. Operation of the DC motor causes the threaded drive rod to be driven so as to cause the second track members to move up and down slidably relative to the seat back, thereby allowing the headrest and seat belt guide to be concurrently adjusted to suit the height of the driver with a single adjustment. In the preferred embodiment, a reinforcement member is affixed to a lateral side of the seat back portion and the first track members are mounted to the reinforcement member. This reinforced structure enables the present invention to exceed federal seat belt load standards.

20 Claims, 5 Drawing Sheets

ADJUSTABLE BELT GUIDE AND HEADREST

BACKGROUND OF THE INVENTION

1. Technical Field

This invention relates generally to vehicle seats and more particularly to a vehicle seat having a motor driven and adjustable headrest portion which includes a seat belt guide for allowing the portion of the shoulder belt which fits over a shoulder of the seat occupant to be vertically adjusted concurrently with the headrest.

2. Discussion

The front seats of passenger vehicles, at present, are required to include some form of shoulder belt assembly which fits across the chest portion of an occupant of the seat for helping to restrain the occupant in the event of an accident. Such shoulder belt assemblies are typically secured, in four door vehicles, to the "B"-pillar of the vehicle's body. The B-pillars extend vertically between the front and rear doors on each of the passenger and driver sides of the vehicle. On two door passenger vehicles the shoulder belt guide is positioned on the portion of the vehicle body immediately behind the front doors of the vehicle. Accordingly, the shoulder belt guide is typically not adjustable vertically in accordance with the height of the seat occupant.

When drivers or passengers of significantly varying heights occupy the vehicle seat, the non-adjustably secured seat belt guide can often provide for an uncomfortable fit of the shoulder belt around the shoulder or neck portion of the occupant. For example, if the occupant is very short the shoulder belt may tend to not wrap comfortably over the shoulder portion of the person but, instead, may be positioned uncomfortably close to the neck or head of the occupant. Conversely, if a tall individual occupies the vehicle seat, the non-adjustably mounted seat belt guide may cause the shoulder belt to be positioned uncomfortably low on the shoulder, thus causing the shoulder belt to dig into the shoulder portion of the occupant. Therefore, adjustable positioning of the shoulder belt guide is highly desirable for providing a comfortable fit when used with persons of varying heights.

Prior attempts at providing some degree of limited adjustability to the shoulder belt have typically involved providing a position adjustable belt guide on the B-pillar which can be moved up and down along the B-pillar. Such systems, however, are not particularly convenient to use and are not useable in two-door vehicles which do not have B-pillars.

Accordingly, it is a principal object of the present invention to provide a vehicle seat having means for allowing an occupant to adjustably position a shoulder belt guide assembly to allow a shoulder belt operating in connection with the shoulder belt guide assembly to be comfortably, adjustably positioned about the shoulder portion of the seat occupant.

It is a further object of the present invention to provide a vehicle seat having an operator adjustable headrest which includes a shoulder belt guide assembly, where the headrest and shoulder belt guide assembly may be adjusted in height by the operator simultaneously via a single switch or other like means.

It is still another object of the present invention to provide a vehicle seat having a seat back portion and independent headrest which is coupled to a mechanism disposed substantially within the seat back portion for adjustably positioning the headrest and shoulder belt guide, simultaneously, relative to the seat back portion.

It is yet another object of the present invention to provide a reinforced vehicle seat which has mounted directly to the seat frame the seat belt assembly and wherein the mechanism for vertically adjusting the position of the headrest and shoulder belt guide is designed to satisfy the structural requirements necessary to withstand the severe belt loads encountered in an accident.

SUMMARY OF THE INVENTION

The above and other objects are provided by an adjustable belt guide and headrest apparatus in accordance with a preferred embodiment of the present invention. The apparatus generally comprises a means for forming a first track fixedly secured to a frame portion of the vehicle seat, second track means slidably disposed relative to the first track means and having a seat belt guide member and a headrest frame member at an uppermost end portion thereof, and means for driving the second track means relative to the first track means such that the headrest frame member and seat belt guide are concurrently adjustably positioned relative to the seat back portion.

The preferred embodiment of the present invention provides a significant advance in the adjustability of the shoulder belt of the vehicle seat in that the shoulder belt guide is vertically positioned concurrently with the headrest portion of the seat. This allows the portion of the shoulder belt which fits around the occupant's shoulder to be comfortably and automatically adjusted as the occupant adjusts the elevation of the headrest portion of the seat. Accordingly, the shoulder portion of the shoulder belt is comfortably, adjustably positionable over the shoulder portions of individuals varying significantly in height.

In the preferred embodiment the vehicle seat comprises a reinforced or "structural" seat assembly wherein the three-point seat belt subassembly, including retractor, is mounted directly to the seat frame, rather than to the vehicle frame. In particular, the anchors for the seat belt buckle and one end of the seat belt are located on the lateral sides of the seat bottom frame and the seat belt retractor is mounted at the base of the seat back frame. Webbing from the retractor is routed upward within the seat back and through the shoulder belt guide. By mounting the seat belt subassembly directly to the frame of the seat, the need for securing the seat belt retractor assembly to the headliner, the B-pillar or other parts of the vehicle is avoided. This provides a significantly more clutter-free appearance within the vehicle.

In the preferred embodiment of the present invention the means for driving the second track means relative to the first track means is comprised of the following elements: a threaded drive rod which is fixedly secured to the second track means; first gear means which meshingly engages with the threaded drive means; flexible cable means for driving the first gear means; second gear means for driving an input end of the flexible driveshaft means; and reversible motor means for driving the second gear means such that the second gear means drives the flexible cable means in clockwise and counter-clockwise directions.

Optionally, the motor and gearbox subassembly may be directly connected to the threaded rod to eliminate the flexible drive shaft where packaging requirements permit.

The motor means is operated by controls accessible by an occupant of the vehicle which provide for bi-directional control of the rotation of the motor. By causing the motor to be driven in one direction, the flexible cable means and first gear means cause the threaded drive rod to be displaced longitudinally, thus causing the second track means, the headrest frame portion and the shoulder belt guide to all be moved in a first direction relative to the seat back portion. By causing the motor to be driven in the opposite direction, the threaded drive rod is displaced longitudinally in an opposite direction, thus causing the headrest frame member and shoulder belt guide to be moved elevationally in an opposite direction. Accordingly, by controlling the direction of rotation of the motor means, the headrest and shoulder belt guide can be concurrently positioned elevationally either closer to or farther away from the seat back portion. This provides a relatively simple means for accurately positioning the shoulder belt guide relative to the height of the seat occupant.

DETAILED DESCRIPTION OF THE PREFERRED EMBODIMENT

Figure 1:
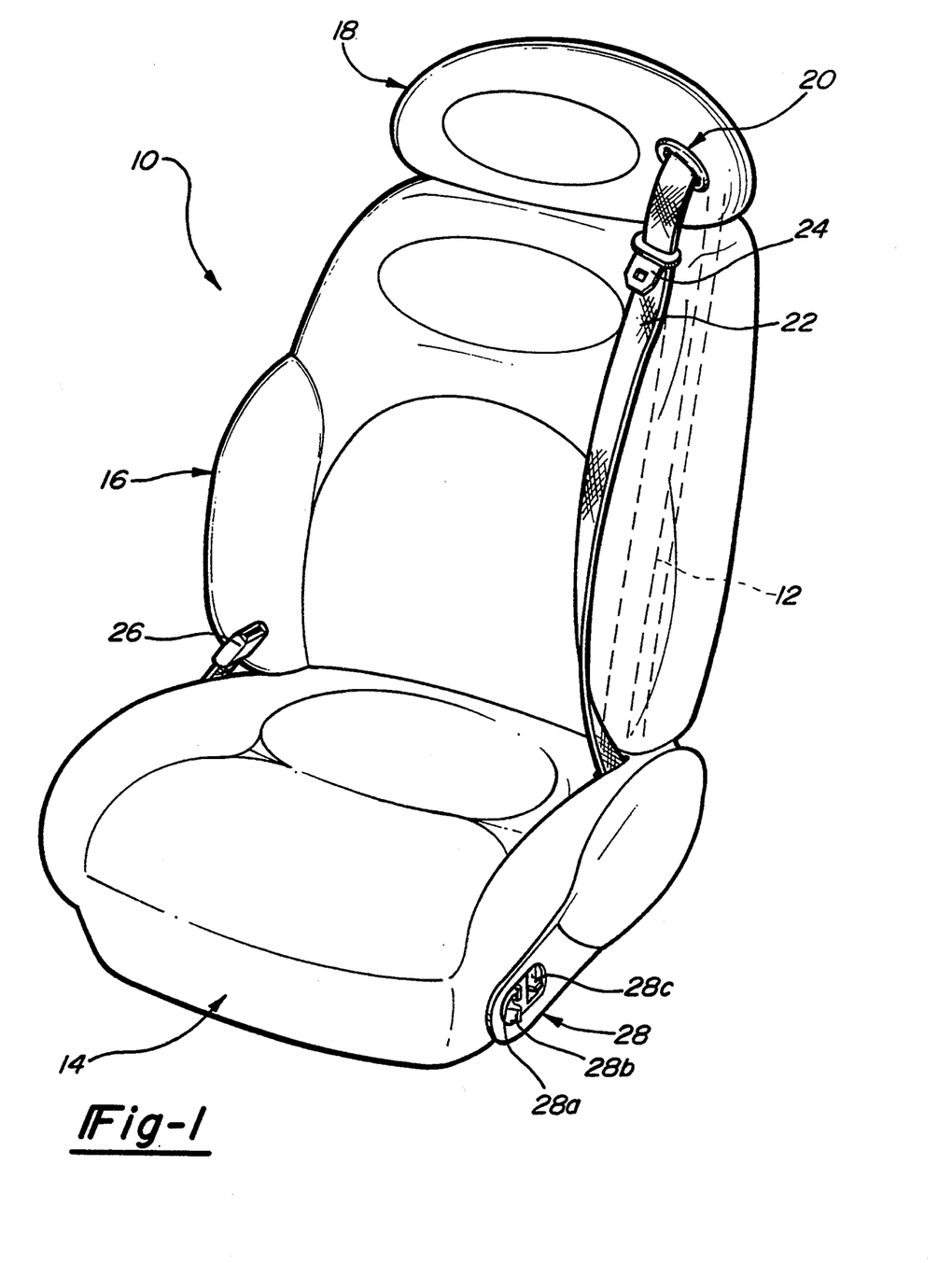
FIG. 1 is an elevational view of the vehicle seat incorporating the apparatus of the present invention.

Referring to FIG. 1, there is shown a vehicle seat 10 with which an apparatus 12 in accordance with a preferred embodiment of the present invention is used. The vehicle seat 10 includes a seat portion 14, a seat back portion 16 and an adjustable headrest 18 having a shoulder belt guide assembly 20. A shoulder belt 22 extends through a portion of the headrest 18 and the seat portion 14. The shoulder belt 22 includes a conventional latch plate 24 which releasably engages with a buckle mechanism 26 that is fixedly secured to a portion of the floor of the vehicle or to the seat bottom frame of the vehicle seat 10.

The seat portion 14 further includes a plurality of operator engageable switches 28a, 28b and 28c for controlling the positioning of the seat 10 within a vehicle. Switch 28a may control fore-and-aft movement of the vehicle seat 10, while switch 28b may control reclining and inclining movement of the seat 10. Switch 28c allows an occupant of the vehicle seat 10 to control the apparatus 12 to adjustably raise or lower the headrest 18, and thus the shoulder belt guide assembly 20, to suit the specific height of the occupant.

Figure 2:
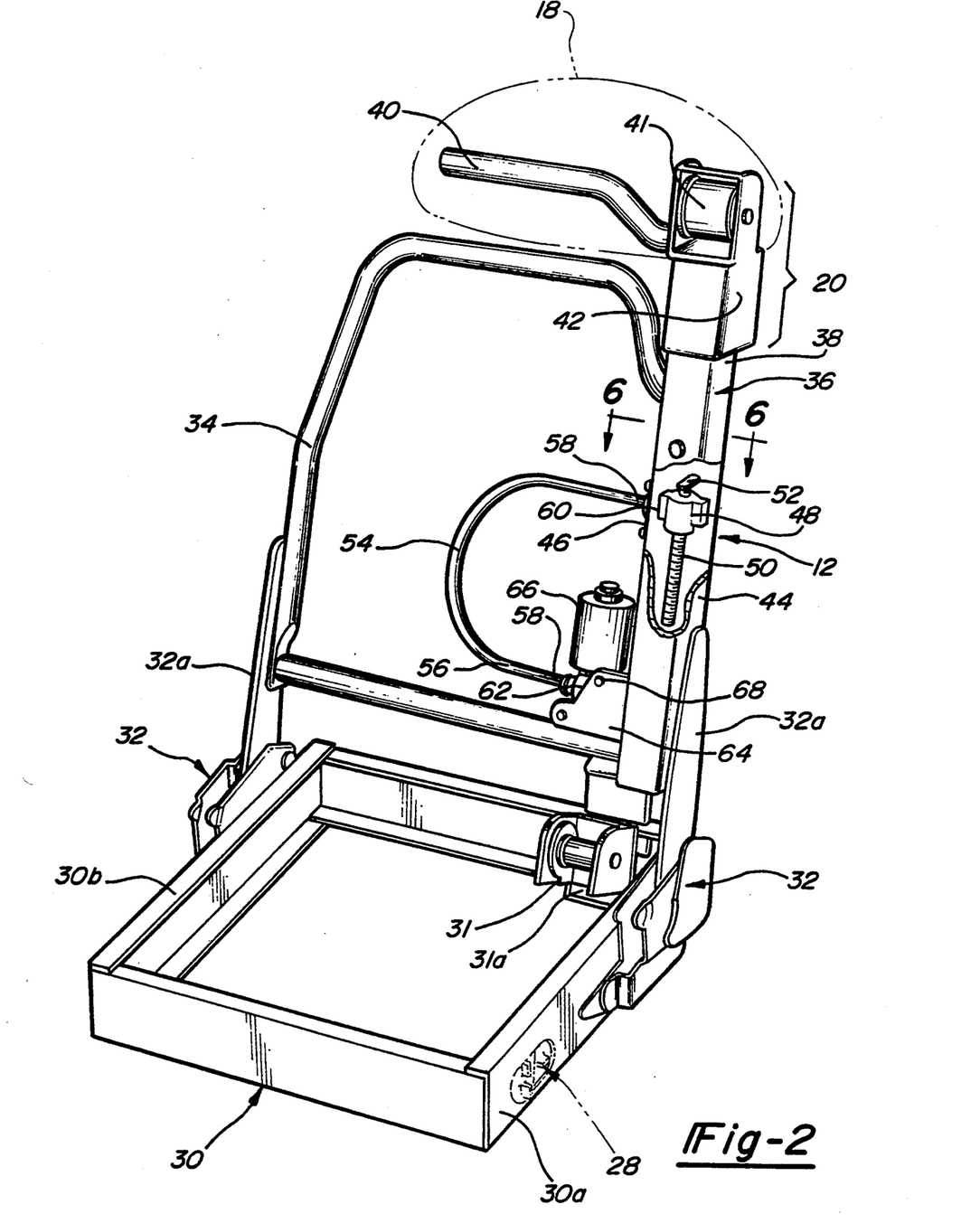
FIG. 2 is an elevational view of the interior of the seat of FIG. 1 showing the apparatus of the present invention and the threaded drive rod and gear box in a partial cut-away view of the main structural beam.

Referring to FIG. 2, the apparatus 12 can be seen more clearly in relation to the other internal components of the vehicle seat 10. The vehicle seat 10 further comprises a seat bottom frame 30 having a retractor mechanism 31 fixedly secured thereto. The retractor mechanism 31 is secured via a retractor mounting plate 31a and any suitable securing means such as threaded bolts and nuts, and is advantageously concealed within the seat bottom frame 30. Recliner mechanisms 32 are secured on opposing side portions 30a and 30b of the seat bottom frame 30 and include upright arm portions 32a. A tubular seat back frame 34 is fixedly secured to the recliner mechanism 32. The recliner mechanisms 32 allow the seat back frame 34 to be moved pivotally relative to the seat bottom frame 30. Optionally, it will be appreciated that the retractor mechanism 31 could be mounted to the seat back frame 34 or incorporated directly into the shoulder belt guide assembly 20 as packaging and trim requirements permit.

The apparatus 12 of the present invention generally includes a track assembly 36 having at an uppermost end portion 38 a cantilevered headrest frame member 40 protruding generally transversely therefrom and the shoulder belt guide assembly 20. The shoulder belt guide assembly 20 includes a roller 41 mounted for rotational movement within a roller housing 42. Optionally, shoulder belt guide 20 could comprise a slide-type guide assembly. The track assembly 36 is disposed partially within a main structural beam 44 fixedly secured to one of the upright arm portions 32a. The main structural beam 44 has secured fixedly therewithin, via a mounting plate 46, a first gear means in the form of a gear box 48. Extending through the gear box 48 is a threaded drive rod 50 having a head plate 52 secured fixedly thereto.

A flexible drive cable 54 having an input end 56 and an output end 58 is coupled fixedly at its output end 58 to an input 60 of the gear box 48. The input end 56 of the drive cable 54 is coupled to a second gear means in the form of a conventional gear speed reduction box 62 which is fixedly secured to the main structural beam 44 via a motor mounting plate 64. The motor mounting plate 64 also secures a reversible DC motor 66 fixedly relative to the main structural beam 44. The motor 66 includes an output shaft 68 which is also coupled to the gear speed reduction box 62. Optionally, the motor could be integrally mounted directly to a gear reduction means combining gear box 62 and gear box 48, thereby eliminating the flexible drive cable.

Figure 3:
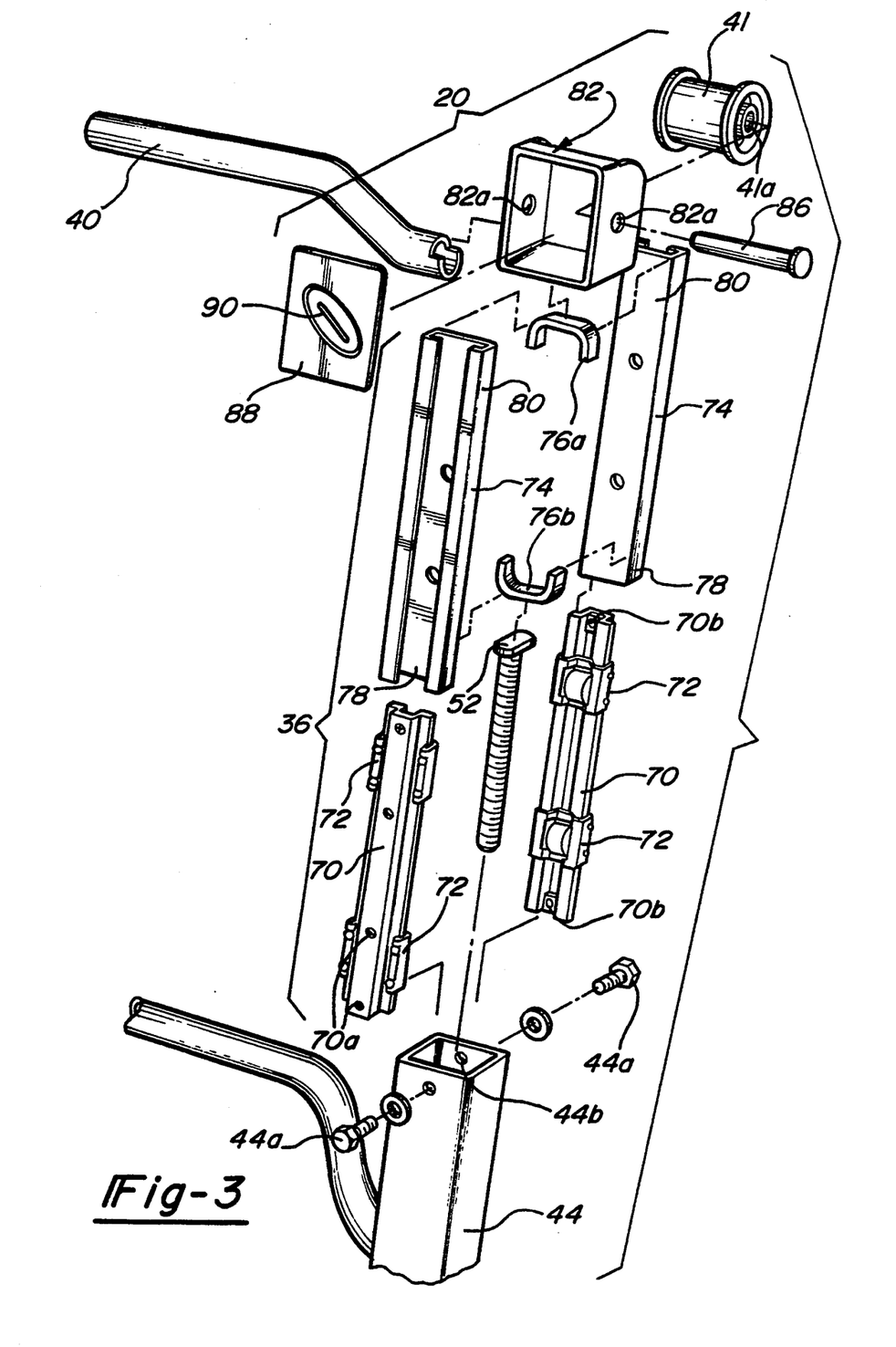
FIG. 3 is an exploded perspective assembly view of the U-shaped and C-shaped track members and the components disposed within the headrest of the seat.
Figure 4:
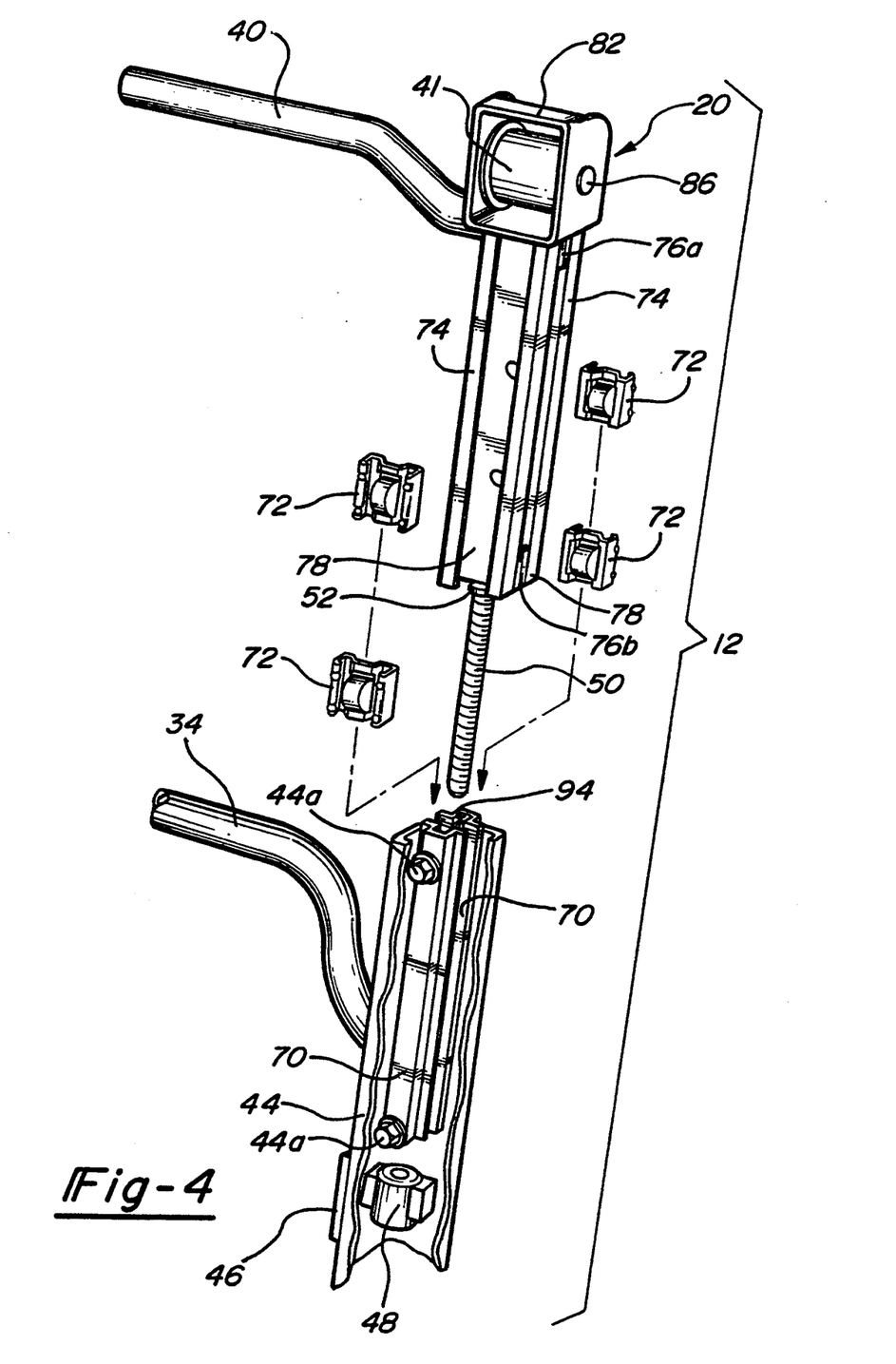
FIG. 4 is an exploded perspective view of the components of the apparatus as shown in FIG. 3 showing the components in assembled relationship.

Referring now to FIGS. 3 and 4, the components and construction of the track assembly 36 can be seen in greater detail. Referring specifically to FIG. 3, the track assembly 36 includes a first pair of generally U-shaped tracks 70 which are positioned closely parallel to each other and fixedly disposed within the main structural beam 44 via bolts 44a which extend through apertures 44b, 70a and weld nuts 70b secured fixedly within each of the U-shaped tracks 70. A plurality of roller/retainer assemblies 72 are slidably disposed on the U-shaped tracks 70. The specific construction of the roller/retainer assemblies 72 will be discussed momentarily in connection with FIG. 5.

With further reference to FIG. 3, the track assembly 36 further includes a pair of second, generally C-shaped track members 74 positioned closely parallel to each other and separated by a predetermined distance by spacer members 76a and 76b. The spacer members 76 are preferably welded or brazed to the C-shaped track members 74 at lowermost end portions 78 and uppermost end portions 80 thereof to form a rigid, unitary structure.

Secured to the uppermost end portions 80 of the C-shaped track member 74 is the shoulder belt guide assembly 20. The guide assembly 20 includes a roller housing box 82 within which is disposed the roller 41, and which is fixedly secured by any suitable means to the spacer 76a and/or the uppermost end portions 80 of the C-shaped tracks 74. The roller 41 is mounted for rotational movement by a roller pin 86 which extends through a central hub portion 41a of the roller 41 and apertures 82a in the roller housing box 82. A cover plate 88 having an elongated opening 90 is positioned over the roller housing box 82. The seatbelt 22 is guided over the roller 41, through the roller housing box 82 and through the opening 90 in the cover plate 88. The cover plate 88 serves to "twist" slightly the shoulder belt 22 (not shown) so that the belt 22 lays generally flat over a shoulder portion of the seat occupant.

With further reference to FIG. 3, the headrest frame member 40 is fixedly secured such as by brazing, welding or any other suitable means of attachment to a portion of the roller housing box 82. The headrest frame meter 40 extends generally transversely of the C-shaped track members 74 and provides a means for supporting cushioning material to form the headrest 18. From the above it should be apparent that the shoulder belt guide assembly 20 and the headrest frame member 40 are fixedly secured to the C-shaped track members 74 such that the shoulder belt guide assembly 20 and the headrest frame member 40 move vertically concurrently with the C-shaped track member 74.

With brief reference to FIG. 4, the U-shaped track members 70, the C-shaped track members 74 and the shoulder belt guide assembly 20 are shown in assembled relation. The U-shaped track members 70 fit within the main structural beam 44 so as to form a generally rectangular, elongated massage 94 which is of sufficient dimensions to allow the threaded drive rod 50 to move freely vertically therewithin without frictional engagement with any interior wall portion of the U-shaped track members 70. The roller/retainer assemblies 72 fit within the passage 94 to facilitate smooth sliding movement of the C-shaped track members 74 relative to the U-shaped track members 70.

The head plate 52 of the threaded drive rod 50 also has dimensions which allow it to move vertically within the passage 94 without frictionally engaging any interior wall portion of either of the U-shaped track members 70. The head plate 52 is fixedly secured, such as by welding or brazing, to the lowermost end portions 78 of the C-shaped track members 74 to thus enable the C-shaped track members 74 to be urged slidably and smoothly vertically relative to the U-shaped track members 70.

Figure 5:
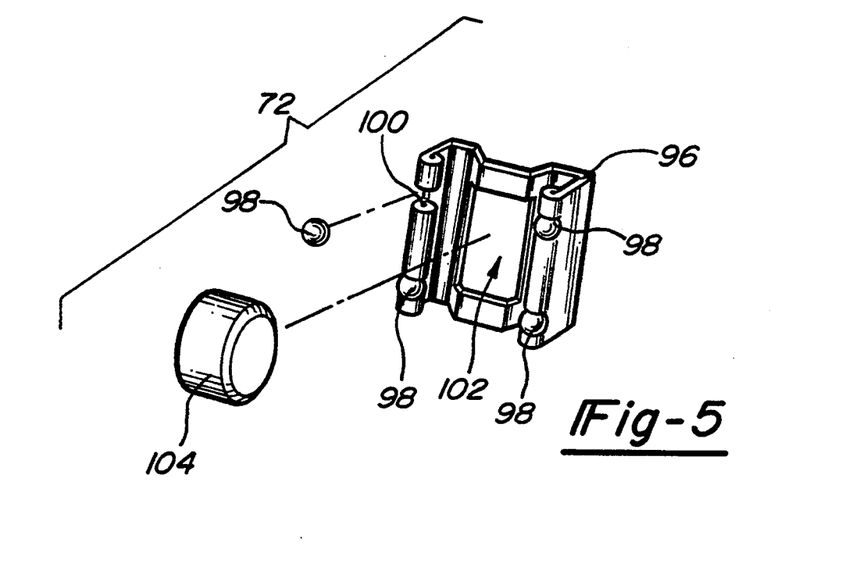
FIG. 5 is an exploded perspective view of the roller/retainer assembly used in the apparatus of the present invention.

Referring to FIG. 5, the construction of one of the roller/retainer assemblies 72 can be seen in greater detail. The assembly 72 includes a retainer portion 96 having a plurality of ball bearings 98 captively held within cut-out sections 100. A central cut-out portion 102 allows a roller member 104 to extend through the retainer portion 96 to end age portions of one of the C-shaped track members 74 and a corresponding one of the U-shaped track members 70. The ball bearings 98 further help to facilitate smooth, friction free sliding movement of the C-shaped track members 74 relative to the U-shaped track members 70 and to maintain a predetermined, approximate clearance between the track members 74 and 70.

Figure 6:
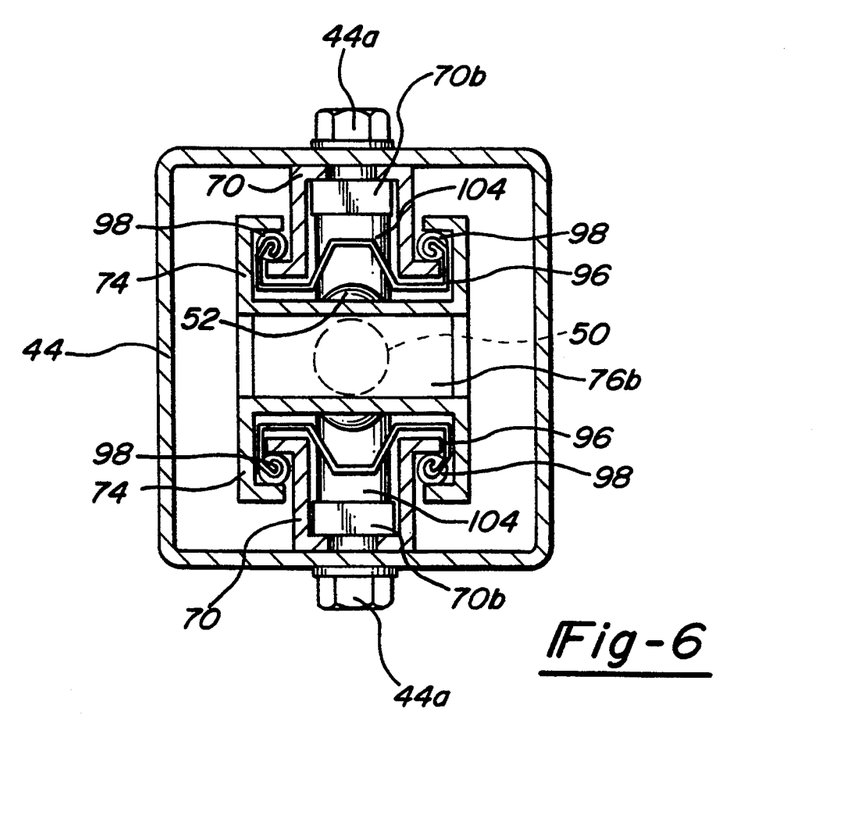
FIG. 6 is a cross sectional view of the C-shaped track members and the U-shaped track members in assembled relation within the main structural beam in accordance with section line 6—6 of FIG. 2.

Referring now to FIG. 6, the C-shaped track members 74 are shown in assembled relationship to the U-shaped track members 70, with both pairs of track members 74 and 70 disposed within the main structural beam 44. From FIG. 6 it can be seen how the rollers 104 facilitate sliding movement of the C-shaped track members 74 relative to the U-shaped track members 70, and further how the ball bearings 98 also help facilitate sliding movement as well as preventing unwanted twisting or rocking movement of the C-shaped track members 74 relative to the U-shaped track members 70.

Referring again to FIGS. 1–4, a description of the operation of the apparatus 12 will now be provided. Initially, the occupant of the vehicle seat 10 moves switch 28c in a first direction, preferably upwardly, which in turn causes the motor 66 to be driven in a first direction. As the motor rotates in the first direction the gear speed reduction box 62 causes a reduction in the rotational speed to a predetermined desired rotational speed, and also translates the rotational movement of the output shaft 68 of the motor approximately 90 degrees. This causes the flexible drive cable 54 coupled to the gear speed reduction box 62 to be driven rotationally in the first direction. The output end 58 of the flexible drive cable 54 drives the first gear box 48, which in turn causes the threaded drive rod 50 to be driven longitudinally in a first direction, for example, upwardly.

As the threaded drive rod 50 is driven upwardly, the head plate 52 moves the C-shaped track members 74 linearly and slidably upwardly along the U-shaped track members 70. This causes the headrest 18 and the shoulder belt guide assembly 20 to be driven concurrently upwardly relative to the seat back portion 16 of the vehicle seat 10. The motor 66 is driven continuously while the occupant holds the switch 28c in an engaged position. Since the shoulder belt guide assembly 20 is included within the headrest 18, adjustment of the headrest 18 to a desired height also serves to adjust the shoulder belt guide assembly 20 simultaneously to an appropriate position to suit the specific height of the occupant.

To cause movement of the headrest 18 in the opposite direction, the operator moves switch 28c in the opposite direction. This causes the motor 66 to be driven in the opposite direction, thereby causing the flexible drive cable 54 to drive the threaded drive rod 50 in the opposite rotational direction. This causes the head plate 52, and thus the C-shaped track members 74, to be withdrawn slidably linearly along the U-shaped track members 70 within the main structural beam 44. As the C-shaped track members 74 move downwardly, the headrest 18 and shoulder belt guide 20 also move downwardly concurrently therewith. When the occupant releases the switch 28c, operation of the motor 66 is halted and the C-shaped track members 74 are held fixedly relative to the U-shaped track members 70.

The apparatus 12 of the present invention thus provides a very convenient and relatively simple means by which the shoulder belt guide assembly 20 can be adjusted accurately and quickly to suit the height of the seat occupant. Since the retracting mechanism 31 and shoulder belt guide 20 are disposed within the vehicle seat 10, the need for external components to be mounted to the headliner of the vehicle, to the B-pillar or other interior body portions is obviated, thus providing a more clutter-free environment within the vehicle and enhancing the ease of entry and exit into the rear seats of two door passenger vehicles. The ability to simultaneously adjust the headrest and the shoulder belt guide also add significantly to the convenience and ease with which occupants of varying heights can adjust the shoulder belt 20 to more comfortably fit over the shoulder area.

Importantly, it will be noted that the main structural beam 44 and track assembly 36 of the present invention are designed and constructed to meet and preferably exceed applicable federal seat belt load requirements. In particular, since the beam 44 and track assembly 36 support the shoulder belt guide assembly 20, the structure must be sufficiently strong to withstand the bending, torsional, and compressive loads that are exerted on the column by the seat belt system during a vehicle impact. Specifically, current federal guidelines require that the seat belt system be capable of withstanding application loads of 1500 pounds and total seat belt loop loads of 3000 pounds. Therefore, the structural beam 44 and track assembly 36 must be sufficiently strong to carry a belt load applied at the shoulder belt guide 20 in the forward direction substantially perpendicular to the longitudinal axis of the track assembly 36 of at least 1500 pounds without bending or collapsing. The presently described preferred embodiment of the invention has been successfully tested at belt loads as high as 3000 pounds and total loop loads up to 6000 pounds.

It should also be appreciated that the components of the apparatus 12 are preferably constructed of strong yet reasonably lightweight materials. The U-shaped and C-shaped track members 70 and 74, respectively, are preferably manufactured from steel or aluminum or any other suitably rigid yet reasonably lightweight material.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:
1. A vehicle seat having a vertically adjustable shoulder belt guide and headrest apparatus, said apparatus comprising:
first track means extending longitudinally through a seat back portion of said seat, said first track means being fixedly secured to a frame member of said vehicle seat;
second track means slidable relative to said first track means for vertically positioning relative to said seat back portion a headrest and a shoulder belt guide affixed to the upper end of said second track means such that said shoulder belt guide is caused to move with said headrest in response to linear movement of said second track means; and
operator controllable driving means for controllably driving said second track means linearly relative to said first track means to thereby cause said headrest and said shoulder belt guide to be adjustably positioned vertically relative to said seat back portion.

2. The vehicle seat of claim 1, wherein said driving means comprises:
a threaded drive rod fixedly secured to said second track means;
first gear means fixedly disposed relative to said first track means for meshingly engaging said threaded drive rod;
a flexible drive cable shaft having an input end and an output end, said output end being coupled with said first gear means; and
reversible motor means for driving said flexible cable in clockwise and counter-clockwise directions to cause said first gear means to drive said threaded drive rod, said driving of said threaded drive rod thereby causing said second track means to be driven linearly relative to said first track means to adjustably position said headrest and said shoulder belt guide relative to said seat back portion.

3. The vehicle seat of claim 2, further comprising:
second gear means coupled to an output shaft of said motor means and said input end of said flexible drive cable for causing said drive cable to be driven rotationally in relation to an output speed of said motor means.

4. The vehicle seat of claim 1, wherein said first track means comprises a pair of elongated, generally U-shaped track members positioned generally parallel to each other.

5. The vehicle seat of claim 1, wherein said second track means comprises a pair of generally C-shaped, elongated track members positioned parallel to each other.

6. The vehicle seat of claim 5, further comprising:
a threaded drive rod fixedly secured to and between said C-shaped elongated track members and extending generally longitudinally therewith; and
first gear means meshingly engaged with said threaded drive rod and responsive to said driving means for driving said drive rod and therefore said C-shaped track members linearly relative to said first track means, to thereby cause said shoulder belt guide and said headrest to be simultaneously adjustably positioned relative to said seat back portion.

7. The vehicle seat of claim 1, further comprising bearing means interposed between said first and second track means.

8. The vehicle seat of claim 1 wherein said first and second track means are constructed to withstand belt loads in excess of 1500 pounds applied to said shoulder belt guide in a forward direction substantially perpendicular to the longitudinal axis of said first and second track means.

9. The vehicle seat of claim 8 wherein said seat back portion includes a reinforcement member affixed to a lateral side thereof and said first track means is affixed to said reinforcement member.

10. A vehicle seat having an adjustable belt guide and headrest apparatus, said apparatus comprising:
a first track assembly disposed fixedly relative to a seat back portion of said vehicle seat;
a second track assembly slidably engaged with and movable relative to said first track assembly, said second track assembly having an uppermost end portion;
said uppermost end portion including a shoulder belt guide member and a headrest frame member extending generally transversely therefrom so as to be positioned over said seat back portion;
a shoulder belt disposed partially within said seat back portion such that a portion of said shoulder belt extends through said shoulder belt guide member;

gear drive means coupled to said second track assembly for driving said second track assembly slidably longitudinally relative to said first track assembly; and reversible motor means for driving said gear drive means in first and second rotational directions such that said second track assembly is driven longitudinally relative to said first track assembly to vertically adjust and simultaneously position said shoulder belt guide member and said headrest frame member relative to said seat back portion in response to operator control of said motor means.

11. The vehicle seat of claim 10, wherein said first track assembly comprises a generally U-shaped, elongated track.

12. The vehicle seat of claim 11, wherein said second track assembly comprises a generally C-shaped elongated track member.

13. The vehicle seat of claim 12, wherein said gear drive means comprises a threaded drive rod and gear nut assembly that is fixedly secured to said C-shaped, elongated track member.

14. The vehicle seat of claim 13, wherein said motor means comprises a reversible DC motor having an output shaft that is drivingly coupled to said gear nut such that rotation of said gear nut causes linear displacement of said threaded drive rod.

15. The vehicle seat of claim 10 wherein said seat back portion includes a reinforcement member extending along a lateral side thereof and said first track assembly is affixed to said reinforcement member.

16. A vehicle seat having a shoulder belt, a seat back portion, and an adjustable shoulder belt guide and headrest apparatus disposed within said seat back portion, said apparatus comprising:

a first pair of elongated track members forming a first track assembly and disposed fixedly within said seat back portion;

a second pair of elongated track members forming a second track assembly moveable longitudinally and slidably relative to said first track assembly;

a threaded drive rod fixedly secured to and between said second pair of elongated track members;

first gear means disposed fixedly relative to said first track assembly and meshingly engaged with said threaded drive rod;

second gear means coupled to said first gear means; and a reversible DC motor having an output shaft, said output shaft being coupled to said second gear means such that said motor drives said second gear means in first and second rotational directions, to thereby cause said first gear means to drive said threaded drive rod and said first track assembly longitudinally such that said shoulder belt guide and said headrest apparatus are concurrently adjustably positioned relative to said seat back portion to thereby adjustably position said shoulder belt.

17. The vehicle seat of claim 16 wherein said seat back portion includes a reinforcement member extending along a lateral side thereof and said first pair of track members is affixed to said reinforcement member.

18. A vehicle seat having a seat bottom assembly, a seat back frame, a hinge mechanism connecting the seat back frame to the seat bottom assembly, and a seat belt system including a retractor assembly mounted to one of the seat back frame or the seat bottom assembly and having a shoulder belt emanating therefrom that is adapted to be routed through a shoulder belt guide over the shoulder and across the upper torso of an occupant, the improvement comprising:

an elongated reinforcement member affixed to said seat back frame along a lateral side thereof and connected at its lower end to said hinge mechanism;

a track assembly having a first track member affixed to said reinforcement member and a second track member engaged with said first track member and adapted for longitudinal movement relative to said first track member;

a headrest assembly including said shoulder belt guide mounted to the upper end of said second track member; and operative means for moving said second track member relative to said first track member for adjusting the vertical position of said headrest assembly relative to said seat back frame.

19. The vehicle seat of claim 18 wherein said operative means comprises an electric motor and drive means coupled to said second track member for driving said second track member relative to said first track member.

20. A vehicle seat of claim 19 wherein said track assembly is constructed to withstand belt loads in excess of 1500 pounds applied to said shoulder belt guide in a forward direction substantially perpendicular to the longitudinal axis of said track assembly.

* * * * *